US012599052B2

(12) United States Patent
Gebbeken et al.

(10) Patent No.: US 12,599,052 B2
(45) Date of Patent: Apr. 14, 2026

(54) SOIL CULTIVATION DEVICE

(71) Applicant: LEMKEN GmbH & Co. KG, Alpen (DE)

(72) Inventors: Martin Gebbeken, Alpen (DE); Christian Paeßens, Issum (DE); Simon Belker, Coesfeld (DE); Mark Berendsen, Lengel (NL); Dieter Werries, Alpen (DE)

(73) Assignee: LEMKEN GmbH & Co. KG, Alpen (DE)

( * ) Notice: Subject to any disclaimer, the term of this patent is extended or adjusted under 35 U.S.C. 154(b) by 469 days.

(21) Appl. No.: 18/024,344

(22) PCT Filed: Sep. 3, 2021

(86) PCT No.: PCT/DE2021/100728
§ 371 (c)(1),
(2) Date: Mar. 2, 2023

(87) PCT Pub. No.: WO2022/048708
PCT Pub. Date: Mar. 10, 2022

(65) Prior Publication Data
US 2023/0292642 A1 Sep. 21, 2023

(30) Foreign Application Priority Data

Sep. 4, 2020 (DE) ..................... 10 2020 123 214.4

(51) Int. Cl.
*A01B 29/04* (2006.01)
(52) U.S. Cl.
CPC .......... *A01B 29/041* (2013.01); *A01B 29/043* (2013.01)

(58) Field of Classification Search
CPC ..... A01B 73/04; A01B 29/041; A01B 29/043; A01B 29/06; A01B 73/044; A01B 49/027
See application file for complete search history.

(56) References Cited

U.S. PATENT DOCUMENTS

| | | | | |
|---|---|---|---|---|
| 7,021,397 | B2* | 4/2006 | Pitonyak | A01B 73/044 |
| | | | | 172/311 |
| 9,986,672 | B2* | 6/2018 | Smyth | A01B 29/06 |
| 2007/0240888 | A1* | 10/2007 | Wright | A01B 29/041 |
| | | | | 172/21 |
| 2008/0230162 | A1 | 9/2008 | Piou et al. | |
| 2015/0020718 | A1* | 1/2015 | Pitonyak | A01B 19/04 |
| | | | | 172/459 |
| 2017/0257996 | A1* | 9/2017 | Smyth | A01B 73/04 |

(Continued)

FOREIGN PATENT DOCUMENTS

| | | |
|---|---|---|
| AU | 2396967 A | 1/1970 |
| DE | 7541380 U | 5/1976 |
| DE | 9316875 U1 * | 5/1994 |

(Continued)

*Primary Examiner* — Christopher J Sebesta
*Assistant Examiner* — Blake E Scoville
(74) *Attorney, Agent, or Firm* — Smartpat PLC

(57) ABSTRACT

A roller for agricultural soil cultivation has at least one support body rotatably mounted about an axis of rotation and multiple compaction rings arranged spaced apart from one another next to one another on the support body and intermediate rings arranged between adjacent compaction rings. At least two intermediate rings have a different diameter and/or a different width.

16 Claims, 3 Drawing Sheets

(56) References Cited

U.S. PATENT DOCUMENTS

| | | | |
|---|---|---|---|
| 2020/0045872 A1 | 2/2020 | Landphair et al. | |
| 2020/0120852 A1 * | 4/2020 | Phely .................. | A01B 29/043 |

FOREIGN PATENT DOCUMENTS

| | | | | |
|---|---|---|---|---|
| DE | 19517184 A1 | | 11/1996 | |
| DE | 10227384 A1 * | | 1/2004 | ........... A01B 29/043 |
| DE | 102011050557 A1 | | 11/2012 | |
| EP | 0596486 A1 * | | 5/1994 | ........... A01B 29/041 |
| EP | 1755369 B1 * | | 10/2012 | ........... A01B 29/041 |
| FR | 2793646 A1 * | | 11/2000 | ........... A01B 29/041 |
| RU | 2437776 C2 | | 12/2011 | |
| WO | 9818309 A1 | | 5/1998 | |

* cited by examiner

SOIL CULTIVATION DEVICE

CROSS-REFERENCE TO RELATED APPLICATION

This application is a national stage application, filed under 35 U.S.C. § 371, of International Patent Application No. PCT/DE2021/100728, filed on 2021 Sep. 3, which claims the benefit of German Patent Application No. 10 2020 123 214.4, filed 2020 Sep. 4.

TECHNICAL FIELD

The present invention relates to a soil cultivation device in the form of a roller for an agricultural implement.

BACKGROUND

In agriculture, rollers are usually employed for re-compacting the soil following a preceding cultivation, wherein this can take place offset in time or together combined with other soil cultivation devices. For cultivating the soil the weight of the roller is utilised on the one hand while on the other hand a particular effect in the soil can also be achieved by a profiling of the outer surface of the roller. Such a profiling can be achieved, for example, by constructing the roller from individual discs or rings. In a combination with other soil cultivation devices, for example a tillage combination for seed application with sowing coulters, a roller for the seedbed preparation can be arranged directly in front of the sowing coulters in order to bring about a pre-compaction of the soil. In addition, rollers can also be utilised for depth guidance of a soil cultivation device since they usually sink only slightly into the soil and substantially roll over the surface.

Such a ground roller is known from DE 195 17 184 A1, wherein the ground roller includes a support tube and compaction rings arranged spaced apart thereon. At the back of the support tube, scrapers are arranged below the axis of rotation of the ground roller, which engage between the compaction rings and contact the roller or at least reach very closely up to these. The scrapers serve for removing soil adhesions which accumulate between the compaction rings during the work on the field, wherein because of the scrapers and the soil adhesions, a rolling of the ground roller can be rendered difficult, as a result of which the roller can be more sluggish to pull.

SUMMARY

It is an object of the present disclosure to provide a roller for soil cultivation and an agricultural implement for soil cultivation which make possible an improved and easier cultivation of the soil.

The object is solved through a roller as claimed and through an agricultural implement for soil cultivation as claimed.

A roller for agricultural soil cultivation includes at least one support body rotatably mounted about an axis of rotation and multiple compaction rings arranged spaced apart from one another next to one another on the support body for compacting the soil and intermediate rings arranged between adjacent compaction rings. At least two intermediate rings have a different diameter and/or a different width.

The support body of the roller can be rotatably mounted about an axis of rotation on a support frame or directly on a main frame, for example a combination of multiple soil cultivation devices such as a tillage combination for seed application. The compaction rings of the roller can be slid onto the support body along the axis of rotation in the axial direction. The compaction rings mounted on the support body can be arranged on the support body-side spaced apart from one another or on the support body-side in contact with one another. The compaction rings can be designed in the form of so-called trapeze rings for the row pre-compaction for sowing coulters of a tillage combination for the seed application. Between two adjacent compaction rings, at least one intermediate ring each can be arranged, wherein intermediate rings, based on the support body and/or its axis of rotation, can have in the axial direction different widths and/or in the radial direction different diameters.

Intermediate rings with a smaller diameter can make possible a high and easy throughput of soil, but instead bring about less re-compaction and levelling of the soil. Intermediate rings with a larger diameter, i.e. which reach more closely to the ground, can make possible a higher re-compaction and levelling of the soil but can have a lower and more difficult throughput of soil because of its shorter distance to the ground radially outside. By arranging intermediate rings with different diameters and/or widths along the support body between the compaction rings, a roller can be advantageously adapted to different operating conditions and device combinations. Because of this, the roller can be configured, for example as row pre-compaction roller of a tillage combination for seed application in such a manner that the same predominantly exhibits a high, easy throughput of soil and in the necessary regions the required re-compaction and levelling of the soil. Because of the predominantly easy-to-pull configuration of the roller and of the adequate re-compaction and levelling of the soil, a cultivation of the soil can be improved and additionally facilitated.

In a preferred configuration, the roller comprises at least one first intermediate ring with a first diameter and a first width and at least one second intermediate ring with a second diameter and a second width, wherein the first diameter is smaller than the second diameter and/or the first width is smaller than the second width. The intermediate rings can be arranged coaxially to the compaction rings and/or the support body. The first intermediate ring, in a mounted state, is arranged in the radial direction nearer to the support body than the second intermediate ring. This has the advantage that the first intermediate ring can make possible a higher throughput of soil than the second intermediate ring and the roller can thus be pulled more easily. The second intermediate rings arranged spaced further apart from the support body in the radial direction, offer the advantage of an improved re-compaction and levelling of the soil between the adjoining compaction rings, as a result of which for example an improved seedbed can be provided. The second intermediate rings can have a greater width than the first intermediate rings, as a result of which a larger region between compaction rings can be re-compacted and levelled. The first intermediate ring and the second intermediate ring can be produced from the same or from different material, for example plastic, metal and/or an elastic material. For example, a first intermediate ring, in the case of lower load, can be produced from plastic and a second intermediate ring, because of the higher ground contact, from a more resistant metal.

In a particularly preferred configuration, two intermediate rings with different diameters and/or different widths are arranged between two adjacent compaction rings. For example, a first intermediate ring can be arranged near the support body and radially outside, situated above the same, a second intermediate ring. This has the advantage that because of the first intermediate ring an operationally safe, durable connection of the compaction rings can be ensured whereas the second intermediate ring can be clamped between these compaction rings and make possible a higher re-compaction and levelling of the soil.

In a further configuration, the compaction rings and/or the intermediate rings are non-positively and/or positively connected to the support body. The support body can be designed in the form of a substantially cylindrical or profiled body, for example of a pipe, of a profile shaft and/or of a square tube. The compaction rings and/or intermediate rings can be slid onto the support body in the axial direction. For the in particular detachable positive connection with the support body, the compaction rings and/or intermediate rings can radially inside have a shape corresponding to the profile of the support body. Here, the simplified mounting of the compaction rings and/or intermediate rings on the support body and the fact that the compaction rings and/or intermediate rings can be non-rotatably arranged on the support body is advantageous, as a result of which the rotary motion of the same can take place more reliably and the functional safety of the roller can be increased.

In a particularly preferred configuration, at least one, in particular circumferential, shoulder for receiving a first intermediate ring is formed laterally on the compaction ring on the support body-side. The shoulder can be formed step-like and in the axial direction and/or in the radial direction directed in particular towards the inside, forms a stop for the first intermediate ring. The shoulder and/or the first intermediate ring can be configured in such a manner that in a mounted state a non-positive and/or positive connection between the first intermediate ring and the at least one shoulder, for example in the case of a compaction ring arranged on the roller end-side, can be formed as a result of which the strength of the roller can be increased.

In a particularly preferred configuration, at least one, in particular circumferential, mounting for receiving a second intermediate ring can be formed laterally on the compaction ring radially outside. The mounting can be designed in the form of a, in particular circumferential, groove laterally on the compaction ring. In the axial direction and in the radial direction the mounting can form a stop for the second intermediate ring. The mounting and/or the second intermediate ring can be configured in such a manner that in a mounted state a non-positive and/or positive connection between the second intermediate ring and the at least one mounting, for example with a compaction ring arranged on the roller end-side, can be formed as a result of which the strength of the roller can be increased.

In a further particularly preferred configuration, the first intermediate ring and/or the second intermediate ring are/is, in particular detachably, connected to at least one adjacent compaction ring by way of a connecting element. The connecting element can be designed in the form of a bolt or a rivet connection. The connecting element can be connected to two adjacent compaction rings as a result of which a first and/or second intermediate ring arranged between the two compaction rings can be non-positively and/or positively mounted between the compaction rings. The connecting element can contact the first and/or intermediate ring, for example by passing the connecting element through a corresponding opening in the respective intermediate ring, as a result of which a defined mounting position of the intermediate ring can be adjusted. This would be advantageous for example in the case of a positive connection between an intermediate ring and a compaction ring. For receiving the connecting element, a compaction ring can comprise, laterally, in particular between the shoulder and the mountings for the first and second intermediate ring, at least one recess for the at least partial receiving of the connecting element. By way of the connecting element, the strength, stiffness and functional safety of the roller can be further improved.

In a further preferred configuration, the compaction ring is composed of at least two halves, each of which can be fitted onto the support body in the axial direction. Because of the in particular symmetrically configured halves, a compaction ring can be cost-effectively produced and easily mounted.

In a still further preferred configuration, the first intermediate ring, in particular each, is assigned a clearer and/or the second intermediate ring, in particular each, a scraper. The clearer and scraper can each be assigned to an intermediate ring and, at least partially, project into an intermediate space between adjacent compaction rings in order to be able to remove soil adhesions from the respective intermediate space. The clearers and scrapers can be arranged on the support frame. The support frame is arranged in the working direction behind the axis of rotation of the roller as a result of which shorter and thus more durable clearers and/or scrapers can be employed. In the case of the first intermediate ring with a lower diameter, less soil adhesions can occur than with the second intermediate ring with a larger diameter, so that with a first intermediate ring a clearer for removing soil adhesions can be adequate. The clearer projects partially between the adjacent compaction rings but is arranged spaced apart from the first intermediate ring, so that a low friction resistance occurs. A scraper, by contrast, can project further into the intermediate space between the compaction rings and contact the second intermediate ring circumferentially or reach very closely to the same. Because of this, the resistance during the operation can be higher than with the clearer. By employing first and second intermediate rings with different diameters, the number of the required scrapers can be decreased and thus the friction as a whole reduced so that the roller can be pulled more easily.

Preferentially, at least one bearing device is arranged on the support body end-side, which comprises an adjustable axial preload force which makes possible exerting a substantially axial force on the compaction rings and/or intermediate rings. Because of the bearing device, the support body with the compaction rings and intermediate rings can be rotatably mounted on the support frame. By exerting an axial preload force on the compaction rings and/or intermediate rings, the durability and functional safety of the roller can be increased.

In a preferred configuration, the roller comprises multiple support bodies each mounted on a main frame, which are connected to one other in particular so as to be foldable. By arranging multiple support bodies, in particular each via a support frame, on the basic body, the roller can be designed to be more compact as a result of which a safe road transport conforming to regulations can also be made possible even with large working widths.

Furthermore, the disclosure relates to an agricultural implement for soil cultivation and/or applying granular solids in the form of fertiliser and/or seeds having at least one roller designed as described above. The agricultural implement can be designed in the form of a tillage combination for seed application, which comprises for example a plurality of sowing coulters, wherein a sowing coulter each can be assigned to a compaction ring.

In a preferred configuration of the agricultural implement, the implement, in the working direction in front of the at least one roller, comprises a plurality of ground engagement means in the form of tyres and/or tracks. In the working direction in front of the roller, the implement can comprise a chassis consisting of multiple ground engagement means such as tyres arranged next to one another, which substantially cover the working width of the implement and can carry the machine weight and re-compact and level the soil. Following the roller, in particular the compaction rings, the implement can each comprise sowing coulters for sowing seeds in the soil behind the roller.

Because of the mounting of the ground engagement means a distance or gap can be formed between each of the ground engagement means. This gap can result in that during the soil cultivation the soil between the ground engagement means can be re-compacted less and a dam of soil can develop in each case. The gaps between two ground engagement means can each be assigned a second intermediate ring while the remaining working region can each be assigned first intermediate rings. This has the advantage that because of the second intermediate rings the region between the ground engagement means can be re-compacted and levelled in each case and the remaining regions comprise first intermediate rings, as a result of which an improved seedbed can be created with a roller that is easier to pull.

In the following, the invention is explained in more detail by way of an exemplary embodiment.

DETAILED DESCRIPTION

Figure 1:
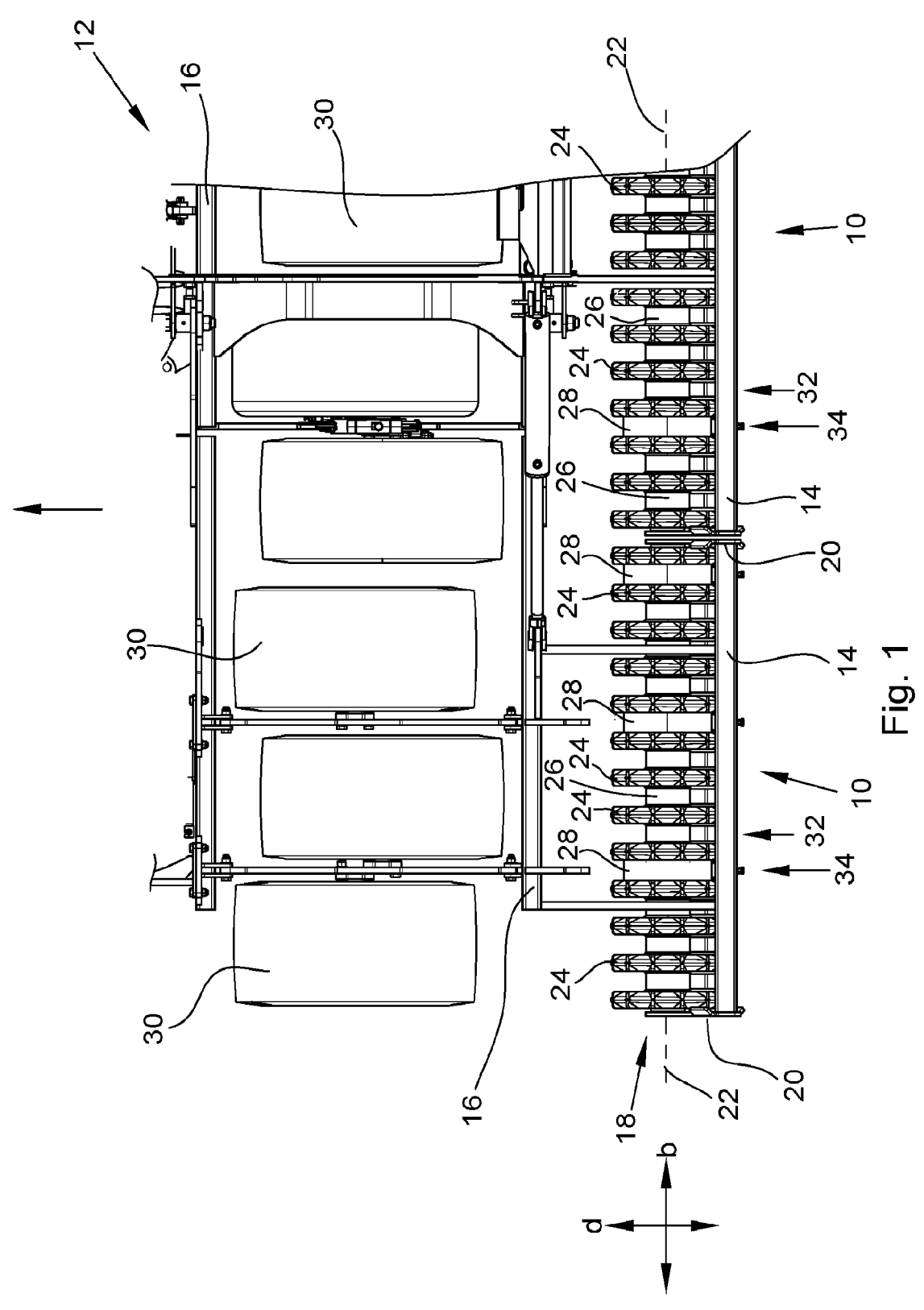
FIG. 1 shows an agricultural implement in the form of a tillage combination for seed application with a roller in a schematic plan view.

In FIG. 1, an agricultural implement 12 in the form of a tillage combination for seed application is shown in a schematic view from the top. The agricultural implement 12 comprises ground engagement means 30 in the form of tyres arranged on a main frame 16, which are arranged next to one another and substantially cover the working width of the implement 12. The ground engagement means 30 can substantially carry the weight of the implement 12 and can additionally serve for re-compacting and levelling the soil for the subsequent sowing of the seeds. For preparing the seed application by sowing coulters (not shown), a roller 10 following the ground engagement means 30 in the working direction (arrow) is arranged, which likewise extends over the working width of the implement 12 and is arranged in the working direction in front of the sowing coulters. The shown roller 10 is configured in multiple parts and comprises support frames 14, which are each attached to the main frame 16 and are designed so as to be foldable for example for a road transport.

The roller 10 includes a multiplicity of compaction rings 24 which are arranged next to one another along a support body 18 on the same, wherein between the compaction rings 24 intermediate rings 26, 28 each are arranged. The support body 18 is rotatably mounted about an axis of rotation 22 and connected to the support frame 14 via bridges 20. The compaction rings 24 are each arranged in front of a sowing coulter (not shown) and serve for the row pre-compaction for the subsequent application of the seeds by the sowing coulters into each of the pre-compacted rows. Because of the mounting of the ground engagement means 30 on the main frame 16, a gap each is formed between the ground engagement means 30, so that the soil between the ground engagement means 30 is less re-compacted and levelled and a dam of soil can develop in each case.

The roller 10 comprises at least two intermediate rings 26, 28, which have a different diameter d1, d2 and/or a different width b1, b2. The intermediate rings 26, 28 of the roller 10 are designed in the form of a first intermediate ring 26 with a first diameter d1 and a first width b1 and a second intermediate ring 28 with a second diameter d2 and a second width b2. The diameter d1 of the first intermediate ring 26 is smaller than the diameter d2 of the second intermediate ring 28. The first intermediate ring 26 makes possible an easier throughput of the soil between the adjoining compaction rings 24, whereas the second intermediate ring 28 has a lower throughput, but instead makes possible a higher re-compaction and levelling of the soil. In the shown embodiment of the roller 10, each gap between two ground engagement means 30 is assigned a second intermediate ring 28 on the roller 10, while in the remaining working region a first intermediate ring 26 each is arranged between the compaction rings 24. By way of this, the soil can be re-compacted and levelled by the second intermediate rings 28 for seedbed preparation in the necessary places, wherein substantially the ease of pulling the roller 10 is retained because of the predominant number of first intermediate rings.

For removing adhering soil, the first intermediate rings 26 are each assigned clearers 32 which are arranged spaced apart from the first intermediate rings 26 and cause only low friction. The second intermediate rings 28 are each assigned scrapers 34, which contact the second intermediate rings 28 or are at least arranged close to these and cause greater friction than the clearers 32. The number of the second intermediate rings 28 can depend on the number of the ground engagement means 30 and the gaps formed between these.

Figure 2:
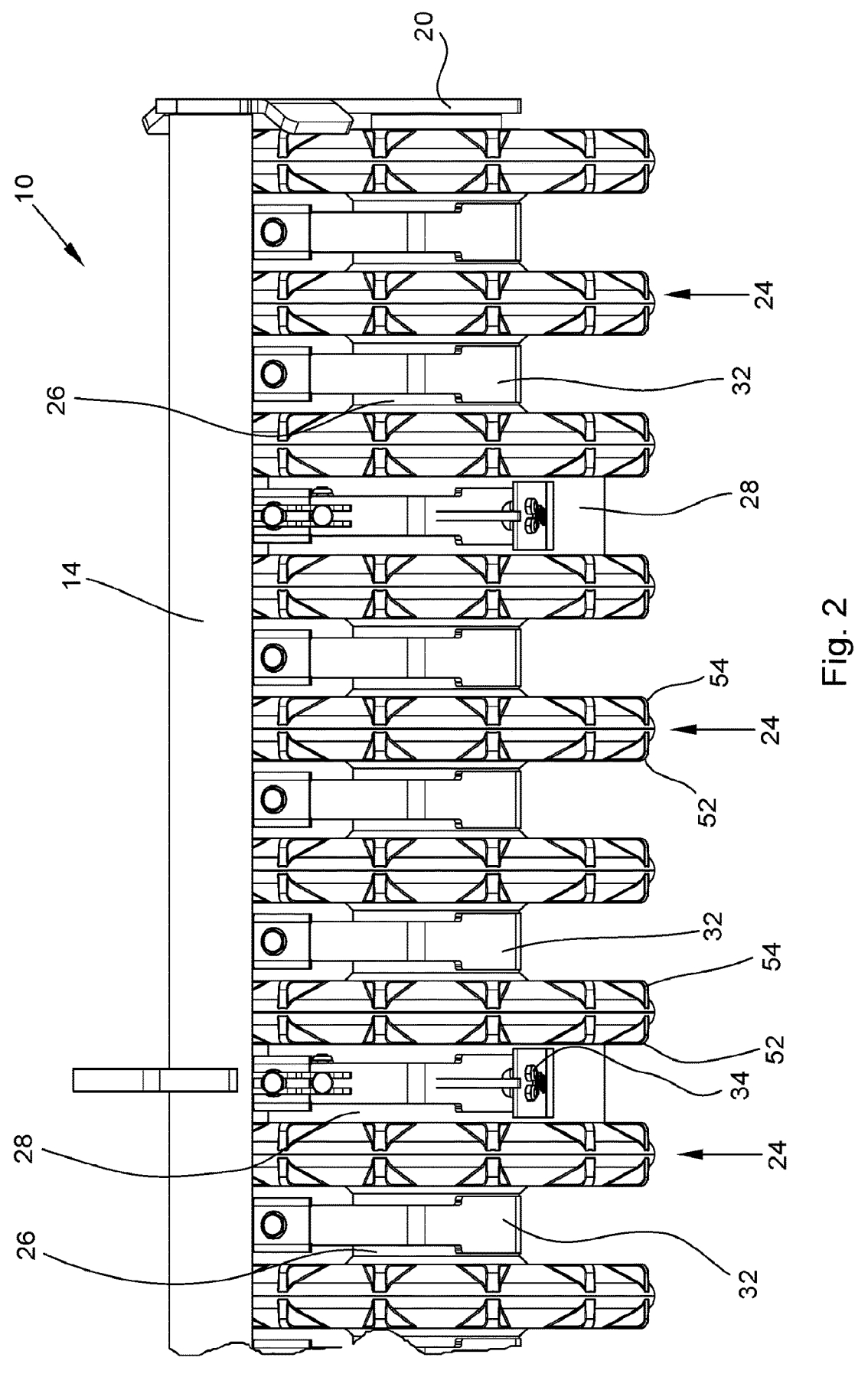
FIG. 2 shows a detailed, rearwards view of a roller from FIG. 1 in working direction.

The roller 10 shown in FIG. 2 is shown in the working direction viewed from the back. The compaction rings 24 are each composed of a first half 52 and a second half 54. The halves 52, 54 can be formed symmetrically and for the assembly can each be slid onto the support body 18. The second intermediate rings 28 arranged between the compaction rings 24 are each assigned a scraper 34 which substantially contacts the second intermediate element 28. The clearers 32 assigned to the first intermediate rings 26 engage less far into the respective space between the compaction rings 24. The clearers 32 and scrapers 34 are each arranged on the support frame 14, which is arranged behind the axis of rotation 22 of the roller 10, as a result of which the clearers 32 and scrapers 34 can be configured shorter and more rigid.

Figure 3:
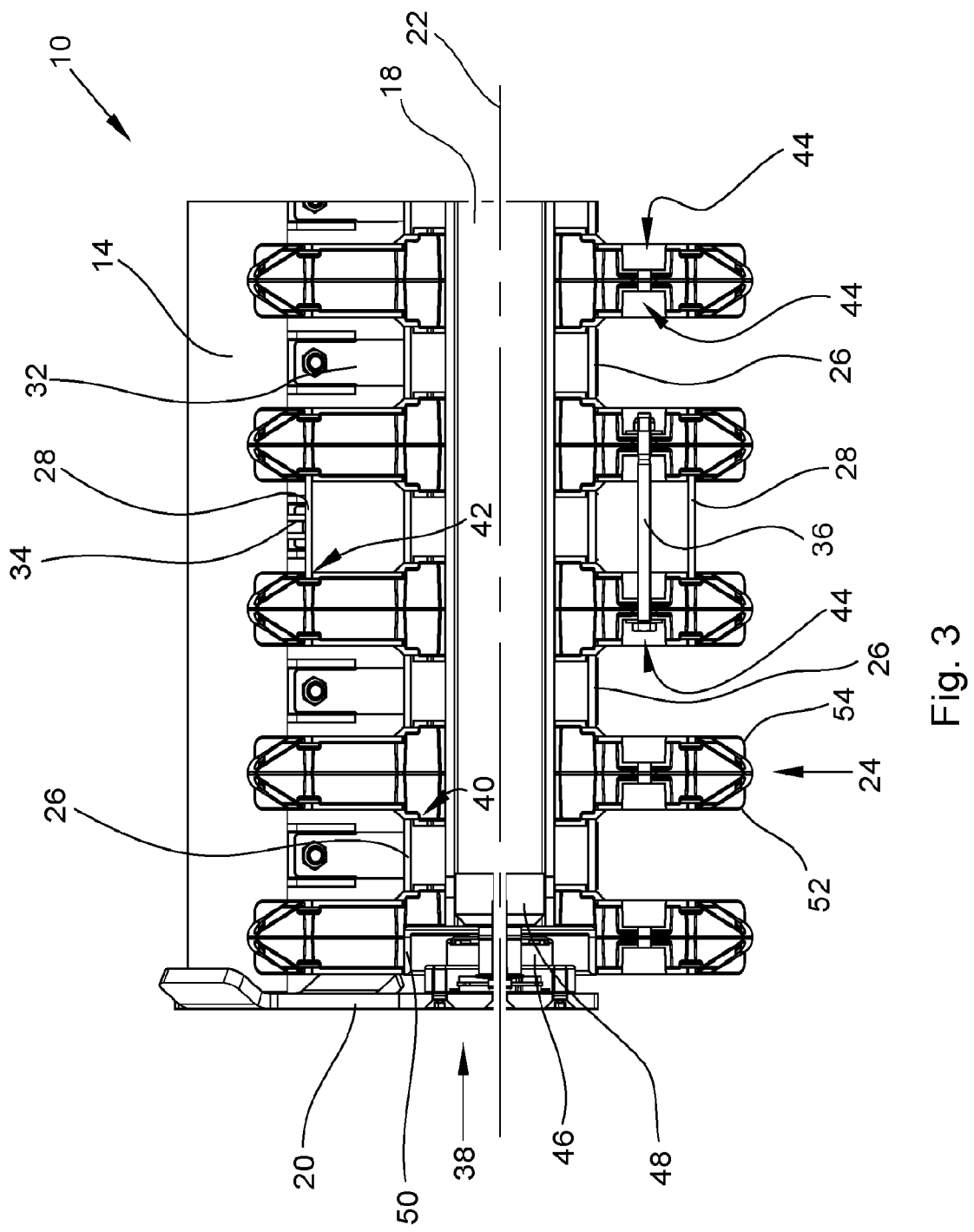
FIG. 3 shows a schematic sectional view of a roller from FIG. 1.

In FIG. 3, a sectional view of a roller 10 from the front is shown, wherein the support frame 14 with the clearers 32 and scrapers 34 is arranged behind the axis of rotation 22 of the roller 10. The compaction rings 24 each composed of two halves 52, 54 are slid onto the support body 18 and each arranged spaced apart from one another by intermediate rings 26, 28. The support body 18 is designed in the form of a square shaft, as a result of which a positive connection of the compaction rings 24 and/or intermediate rings 26, 28, which comprise a profile corresponding to the support body 18 radially inside, with the support body 18 is made possible.

By way of a bearing device 38 each arranged on the end-side, the support body 18 is rotatably mounted on the bridge 20 and by the same connected to the support frame 14. The bearing device 38 comprises a flange 46 with an angle offset 50 on the support body side, which is connected via a screw connection to an insert 48 arranged in the support body 18. The bearing device 38 can be preloaded in the axial direction via the screw connection, wherein a preload force can be transmitted via the angle insert 50 to the compaction rings 24 and/or intermediate rings 26, 28. This has the advantage that the stiffness and functional safety of the roller 10 can be increased.

Between the compaction rings 24, first intermediate rings 26 each are arranged on the support body side. The first intermediate rings 26 are each mounted on a shoulder 40 which is formed in the compaction rings 24. In addition to a first intermediate ring 26, a second intermediate ring 28 is arranged between two compaction rings 24 coaxially to a first intermediate ring 26. The second intermediate ring 28 is mounted in the axial direction on both sides in a lateral mounting 42 of the compaction rings 24. Each of the mountings 42 is designed circumferentially in the form of a groove in the compaction rings 24. Furthermore, the compaction rings 24 comprise, in particular between the shoulder 40 and the mounting 42, a lateral recess 44 for at least partially receiving a connecting element 36. By way of the connecting element 36, for example in the form of a bolt, the two adjacent compaction rings 24 are connected and clamped together, as a result of which the second intermediate ring 28 mounted in between is clamped between the compaction rings 24. This has the advantage that the stiffness and functional safety of the roller can be further increased. An arrangement of exactly one intermediate ring 26, 28 each between two compaction rings 24 is also conceivable.

LIST OF REFERENCE NUMBERS

10 Roller
12 Agricultural implement
14 Support frame
16 Main frame
18 Support body
20 Bridge
22 Axis of rotation
24 Compaction ring
26 First intermediate ring
28 Second intermediate ring
30 Ground engagement means
32 Clearer
34 Scraper
36 Connecting element
38 Bearing device
40 Shoulder
42 Mounting
44 Recess
46 Flange
48 Insert
50 Angle insert
52 First halve
54 Second half
d1 First diameter
d2 Second diameter
b1 First width
b2 Second width

The invention claimed is:

1. A roller for agricultural soil cultivation, comprising:
a support body (18) rotatably mounted about an axis of rotation (22);
multiple compaction rings (24) arranged spaced apart from one another next to one another on the support body (18) for compacting the soil; and
intermediate rings (26, 28) arranged between adjacent compaction rings (24),
wherein the compaction rings (24) have a larger diameter than the intermediate rings (26, 28), and
wherein at least one compaction ring (24) directly abuts, on one side, a first intermediate ring (26) having a first diameter (d1) and a first width (b1), and, on an opposite side, directly abuts a second intermediate ring (28) having a second diameter (d2) and a second width (b2), the second diameter (d2) being different from the first diameter (d1) and/or the second width (b2) being different from the first width (b1), and
wherein the multiple compaction rings (24) and/or the intermediate rings (26, 28) are fixed to the support body (18) for co-rotation therewith by a force-fit or form-fit connection.

2. The roller according to claim 1,
wherein the first diameter (d1) is smaller than the second diameter (d2).

3. The roller according to claim 1,
wherein between two adjacent ones of the multiple compaction rings (24) two of the intermediate rings (26, 28) with different diameters (d1, d2) and/or different widths (b1, b2) are arranged.

4. The roller according to claim 1,
wherein the multiple compaction rings (24) and/or the intermediate rings (26, 28) are fixed to the support body (18) for co-rotation therewith by the force-fit connection.

5. The roller according to claim 1,
wherein the multiple compaction rings (24) and/or the intermediate rings (26, 28) are fixed to the support body (18) for co-rotation therewith by the form-fit connection.

6. The roller according to claim 1,
wherein laterally on at least one of the multiple compaction rings (24) on a support body-side at least one circumferential shoulder (40) for receiving a first of the intermediate rings (26) is formed.

7. The roller according to claim 6,
wherein laterally on at least one of the multiple compaction rings (24) radially outside at least one circumferential mounting (42) for receiving the second intermediate ring (28) is formed.

8. The roller according to claim 2,
wherein the first intermediate ring (26) and/or the second intermediate ring (28) is detachably connected to at least one adjacent compaction ring (24) by a connecting element (36).

9. The roller according to claim 1,
wherein at least one of the multiple compaction rings (24) is composed of at least two halves (52, 54), which can each be fitted in the axial direction onto the support body (18).

10. The roller according to claim 2,
wherein the first intermediate ring (26) is assigned a clearer (32) and/or the second intermediate ring (28) a scraper (34).

11. The roller according to claim 1,
further comprising a bearing device (38) arranged on an end-side of the support body (18), wherein the bearing device (38) applies an adjustable axial preload force onto the multiple compaction rings (24) and/or the intermediate rings (26, 28).

12. The roller according to claim 1, wherein the roller (10) comprises multiple support bodies (18) each mounted on a main frame (16), which support bodies (18) are connected, so as to be foldable, to one another.

13. An agricultural implement (12) for soil tillage and/or applying granular solids in the form of fertilizer and/or seeds with at least one roller (10) according to claim 1.

14. The agricultural implement according to claim 13, wherein the agricultural implement (12) in a working direction in front of the at least one roller (10) comprises a plurality of ground engagement means (30) in the form of tyres and/or tracks.

15. The roller according to claim 1, wherein the first intermediate ring (26) is formed of a plastic material and the second intermediate ring (28) is formed of a metal material.

16. A roller for agricultural soil cultivation, comprising:
a support body (18) rotatably mounted about an axis of rotation (22);

multiple compaction rings (24) arranged spaced apart from one another next to one another on the support body (18) for compacting the soil; and intermediate rings (26, 28) arranged between adjacent compaction rings (24), wherein the compaction rings (24) have a larger diameter than the intermediate rings (26, 28), and wherein at least one compaction ring (24) directly abuts, on one side, a first intermediate ring (26) of a first diameter (d1) and/or width (b1), and, on an opposite side, directly abuts a second intermediate ring (28) of a different diameter (d2) and/or width (b2), wherein the second intermediate ring (28) has a second diameter (d2), and wherein the first diameter (d1) is smaller than the second diameter (d1), wherein the first intermediate ring (26) and/or the second intermediate ring (28) is detachably connected to at least one adjacent compaction ring (24) by a connecting element (36), and wherein at least one of the compaction rings (24) comprises a recess (44) for at least partially receiving the connecting element (36).

\* \* \* \* \*